(12) United States Patent
Baker

(10) Patent No.: US 10,363,853 B1
(45) Date of Patent: Jul. 30, 2019

(54) VEHICLE TRAY SYSTEMS

(71) Applicant: Forrest S. Baker, Heyburn, ID (US)

(72) Inventor: Forrest S. Baker, Heyburn, ID (US)

( * ) Notice: Subject to any disclaimer, the term of this patent is extended or adjusted under 35 U.S.C. 154(b) by 0 days.

(21) Appl. No.: 15/891,310

(22) Filed: Feb. 7, 2018

(51) Int. Cl.
*B60N 3/00* (2006.01)
*B60N 3/16* (2006.01)
*B60N 3/10* (2006.01)
*A47G 23/06* (2006.01)

(52) U.S. Cl.
CPC ......... *B60N 3/002* (2013.01); *A47G 23/0633* (2013.01); *B60N 3/103* (2013.01); *B60N 3/16* (2013.01)

(58) Field of Classification Search
CPC .......... B60N 3/002; B60N 3/103; A47B 31/06
USPC ............................... 108/44, 45, 42
See application file for complete search history.

(56) References Cited

U.S. PATENT DOCUMENTS

| | | | | |
|---|---|---|---|---|
| 1,951,261 A * | 3/1934 | Thompson | ............. | A47B 31/06 108/45 |
| D197,729 S * | 3/1964 | Beychok | ......................... | 108/44 |
| 3,181,483 A * | 5/1965 | Devitt | .................... | A47B 23/00 108/159 |
| 3,311,276 A * | 3/1967 | Fromm | ..................... | B60R 7/04 224/277 |
| 3,345,118 A * | 10/1967 | Cummings | ............ | B60N 3/002 108/44 |
| 3,589,577 A * | 6/1971 | Basinger | ................... | B60R 7/04 108/44 |
| 3,827,772 A * | 8/1974 | Johnson | ................... | B60R 11/02 224/540 |
| 4,619,386 A * | 10/1986 | Richardson | ............... | B60R 7/06 108/44 |
| 4,795,210 A * | 1/1989 | Milat | ...................... | B60N 3/002 108/43 |
| 4,928,865 A * | 5/1990 | Lorence | .................. | B60N 3/102 224/275 |
| 5,037,162 A * | 8/1991 | Ransom | .................. | A47B 23/04 224/926 |
| 5,085,153 A * | 2/1992 | McKee | .................. | B60N 3/002 108/25 |
| 5,370,060 A * | 12/1994 | Wang | ..................... | B60N 3/004 108/149 |
| 5,390,609 A * | 2/1995 | McKee | .................. | B60N 3/002 108/45 |
| 5,479,866 A * | 1/1996 | Rae | ....................... | A47B 23/001 108/25 |
| 5,533,785 A * | 7/1996 | Gould | ..................... | B60N 2/24 297/188.01 |

(Continued)

*Primary Examiner* — Jose V Chen
(74) *Attorney, Agent, or Firm* — Thorpe North & Western

(57) ABSTRACT

A tray system for use in a vehicle may include a tray support base that fits between seats of a vehicle, and a tray platform to support an appliance. A container support platform can be supported by the tray platform for supporting a container removable from the appliance. The tray support base can comprise first and second support legs supporting the tray platform. The first support leg can have a recessed portion to accommodate a transmission hump of the vehicle. A receiver tray can receive and support first and second support legs. A tray system for use in a vehicle may include a tray support base that fits between seats of a vehicle, and a tray platform supported by the tray support base. The tray system includes at least one drawer and a lower compartment to contain an electronics device.

16 Claims, 14 Drawing Sheets

(56) References Cited

U.S. PATENT DOCUMENTS

| | | | | |
|---|---|---|---|---|
| 5,628,439 A * | 5/1997 | O'Hara | ................. | B60N 3/001 108/25 |
| 5,667,272 A * | 9/1997 | Sutton | .................. | B60N 3/002 108/44 |
| 5,730,065 A * | 3/1998 | Smith | .................. | B60N 3/002 108/116 |
| 5,813,354 A * | 9/1998 | Scott | ..................... | B60N 3/004 108/44 |
| 5,951,128 A * | 9/1999 | Aidone | ................. | B60R 7/043 108/44 |
| 6,015,198 A * | 1/2000 | Stair | ..................... | B60N 3/002 108/44 |
| 6,305,299 B1 * | 10/2001 | Ragland | ................ | B60N 3/002 108/44 |
| 6,382,745 B1 * | 5/2002 | Adkins | ................. | B60N 3/002 108/97 |
| 8,327,774 B1 * | 12/2012 | Rivera | .................. | B60N 3/005 108/44 |
| 2010/0154684 A1 * | 6/2010 | Mayne | ..................... | B60R 7/04 108/44 |
| 2014/0252811 A1 * | 9/2014 | Whalen | ................. | B60N 3/002 297/144 |
| 2016/0107550 A1 * | 4/2016 | Hwang | ............... | B60N 2/4686 297/161 |

\* cited by examiner

__US 10,363,853 B1__

VEHICLE TRAY SYSTEMS

BACKGROUND

Motor vehicles are a common means of transportation. Manufacturers of motor vehicles often attempt to devise new configurations of vehicles to add additional features and comfort to occupants of the vehicles. With many people employed in the shipping and transportation industry, as well as a large number of people employed at some distance from work that involves commuting, many features have been added to vehicles to enable easier consumption of food or beverages while in the vehicle. For example, cup holders are commonly included in many modern cars.

In addition to being a matter of convenience, many people may wish to consume meals, such as breakfast, lunch or dinner while driving or riding in a vehicle and within the confines of the vehicle. For example, salesman, commercial truck drivers and the like may spend a large portion of the day driving and may not have the time or convenience to stop to eat a meal. Some options for meals include purchasing food at a fast food outlet. Over a long period of time, regular consumption of food from a fast food outlet may give rise to health concerns.

Additionally, despite the availability of cup holders in many vehicles, there are yet a large number of vehicles that may not easily accommodate food in addition to beverages. Managing food items in the vehicle may be a delicate task to avoid inconvenience to the driver while also making the food readily available to the driver and minimally likely to topple over.

SUMMARY

The technology provides a tray system for use in a vehicle, including a tray support base sized and shaped to fit between seats of a vehicle, and a tray platform supported by the tray support base. The tray platform includes an upper surface area sized and shaped to support an appliance, and the upper surface area has a length sized to accommodate opening and closing a compartment of the appliance about the upper surface area.

The tray support base can comprise a first support leg and a second support leg supporting the tray platform. The first support leg can be positionable forward of a cabin of the vehicle, and the second support leg can be positionable rearward of the first support leg.

The first support leg can comprise a recessed portion formed along a lower end of the first support leg, which can be sized and shaped to rest along a protrusion area of a cabin floor of the vehicle.

The tray system can comprise a container support platform supported by the tray platform, which can be shaped and sized to slidably support a container removable from the appliance.

The tray system can comprise a receiver tray situated below the tray platform, which can be sized and shaped to receive and support the tray support base. The tray support base can be removably interfaced to the receiver tray.

The tray support base can comprise a first side wall and an opposing second side wall. The first and second side walls support the tray platform, and the tray platform comprises a beverage container support portion extending outwardly from the first side wall and defining at least a portion of the tray platform.

The tray system can comprise a base removably supported by a cup holder of the beverage container support portion, and can further comprise a tray coupled to the base.

The tray and the base can be rotatably supported by the beverage container support portion about a central axis of rotation orthogonal to a planar surface of the tray platform.

DETAILED DESCRIPTION

Figure 1:
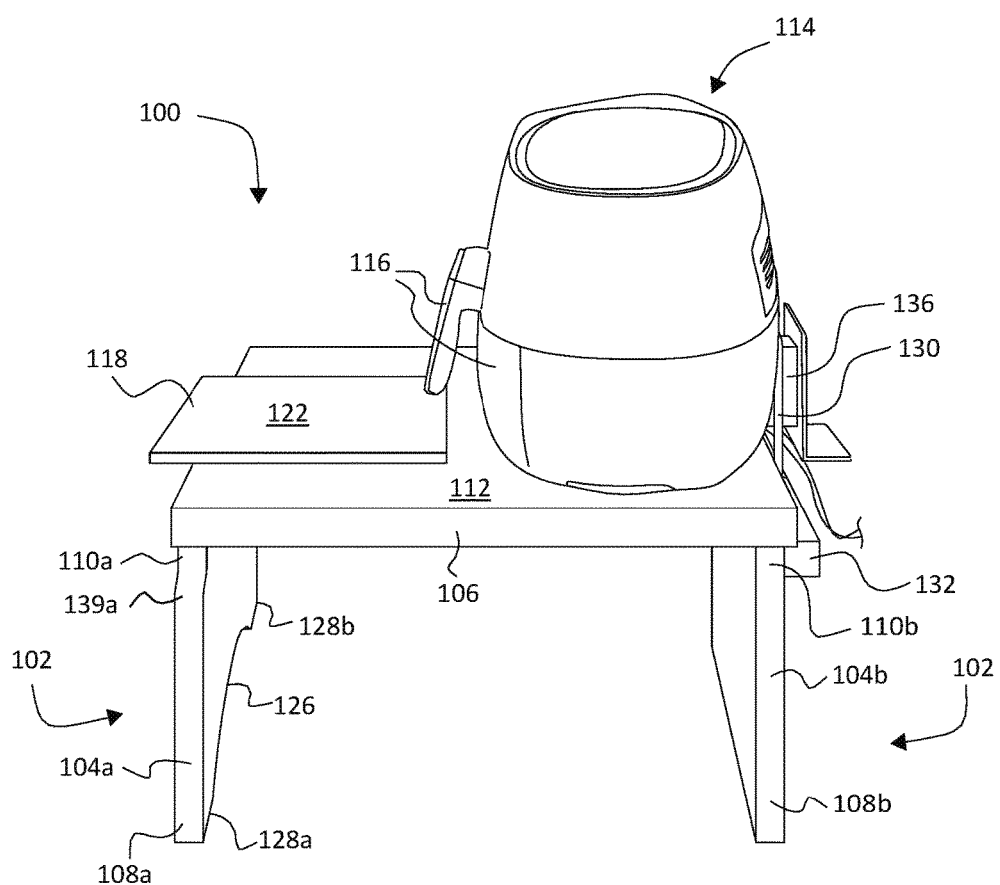
FIG. 1 is a right side perspective view of a tray system, supporting an appliance, in accordance with an embodiment of the present technology.

Before the present disclosure is described herein, it is to be understood that this disclosure is not limited to the particular structures, process steps, or materials disclosed herein, but is extended to equivalents thereof as would be recognized by those ordinarily skilled in the relevant arts. It should also be understood that terminology employed herein is used for the purpose of describing particular embodiments only and is not intended to be limiting.

DEFINITIONS

The following terminology will be used in accordance with the definitions set forth below.

As used herein, "adjacent" refers to near or close sufficient to achieve a desired effect. Although direct physical contact is most common and preferred in the structures or volumes of the present invention, adjacent can broadly allow for spaced apart features.

As used herein, the singular forms "a," and, "the" include plural referents unless the context clearly dictates otherwise.

As used herein, the term "substantially" refers to the complete or nearly complete extent or degree of an action, characteristic, property, state, structure, item, or result. For example, an object that is "substantially" enclosed would mean that the object is either completely enclosed or nearly completely enclosed. The exact allowable degree of deviation from absolute completeness may in some cases depend on the specific context. However, generally speaking the nearness of completion will be so as to have the same overall result as if absolute and total completion were obtained. The use of "substantially" is equally applicable when used in a negative connotation to refer to the complete or near complete lack of an action, characteristic, property, state, structure, item, or result. For example, a composition that is "substantially free of" particles would either completely lack particles, or so nearly completely lack particles that the effect would be the same as if it completely lacked particles. In other words, a composition that is "substantially free of" an ingredient or element may still actually contain such item as long as there is no measurable effect thereof.

As used herein, the term "about" is used to provide flexibility to a numerical range endpoint by providing that a given value may be "a little above" or "a little below" the endpoint.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Dimensions, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc., as well as 1, 2, 3, 4, and 5, individually.

This same principle applies to ranges reciting only one numerical value as a minimum or a maximum. Furthermore, such an interpretation should apply regardless of the breadth of the range or the characteristics being described.

THE DISCLOSURE

Reference will now be made to the exemplary embodiments illustrated, and specific language will be used herein to describe the same. It will nevertheless be understood that no limitation of the scope of the technology is thereby intended. Additional features and advantages of the technology will be apparent from the detailed description which follows, taken in conjunction with the accompanying drawings, which together illustrate, by way of example, features of the technology.

With the general examples set forth in the Summary above, it is noted in the present disclosure that when describing the system, or the related devices or methods, individual or separate descriptions are considered applicable to one other, whether or not explicitly discussed in the context of a particular example or embodiment. For example, in discussing a vehicle tray per se, device, system, and/or method embodiments are also included in such discussions, and vice versa.

Furthermore, various modifications and combinations can be derived from the present disclosure and illustrations, and as such, the following figures should not be considered limiting.

As illustrated in FIGS. 1-8, a tray system (or apparatus or assembly), indicated generally at 100, in an example implementation in accordance with the technology is provided for use in a vehicle and capable of carrying or supporting appliance(s), food, beverages and any of a variety of other items. The tray system 100 may be formed of any of a variety of different materials including, but not limited to, wood, plastic, metal, composite and other materials and combinations thereof. The formation and/or assembly of the tray system may be performed using any of a variety of technologies as may be understood by one having skill in the art. For example, a wood tray system may be created by carving the tray from a single piece of wood or may be assembled by gluing, stapling, nailing press-fitting and so forth.

Figure 5:
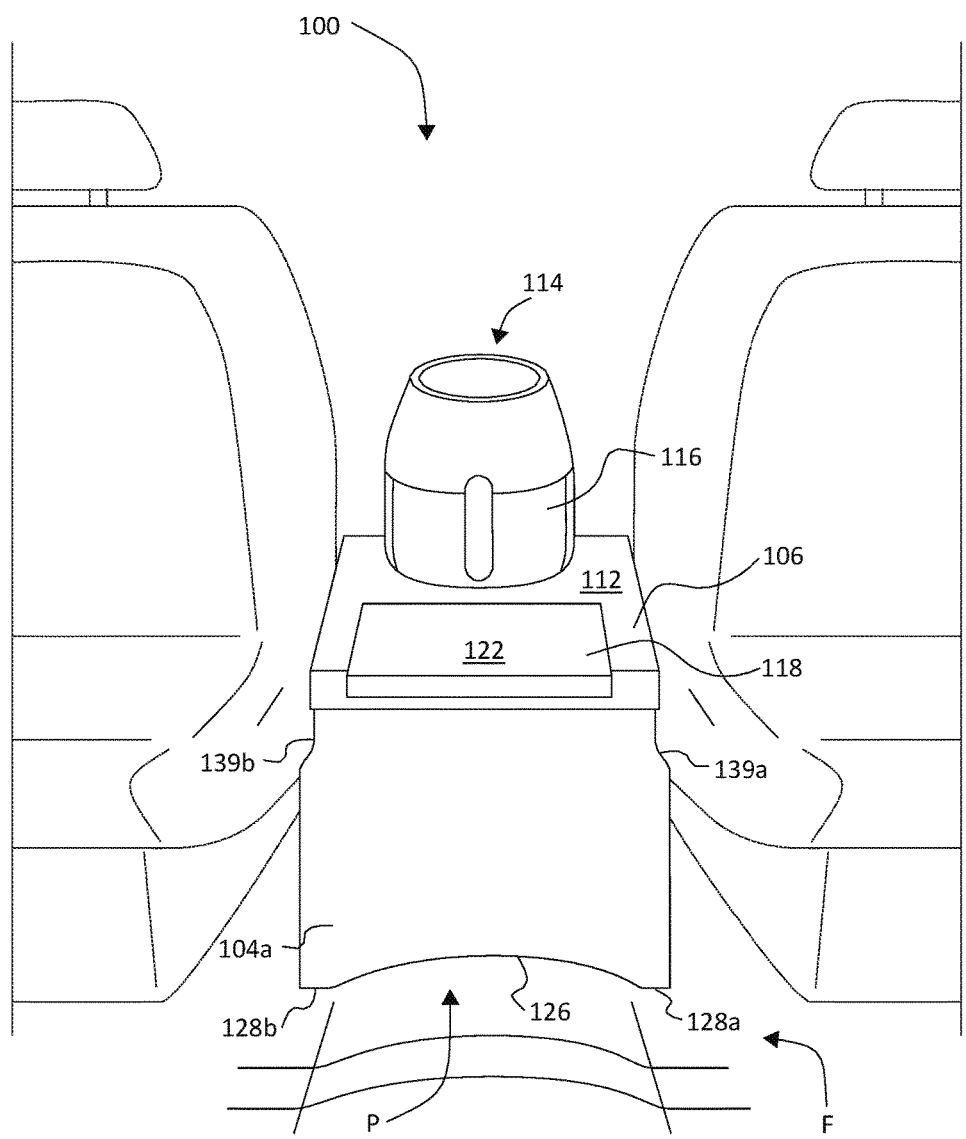
FIG. 5 is a front perspective view of the tray system of FIG. 5 positioned between a pair of vehicle seats in accordance with an embodiment of the present technology.

In one example, the tray system 100 comprises a tray support base 102 sized and shaped to fit between front seats of a vehicle (see FIG. 5). The tray support base 102 can comprise a first support member or leg 104a, and a second support member or leg 104b. The tray system 100 can further comprise a tray platform 106 supported by the tray support base 102. That is, the first and second support legs 104a and 104b can be generally vertical support members or panels or legs, each having respective lower ends 108a and 108b that rest upon a cabin floor of the vehicle, and each having respective upper ends 110a and 110b that support opposing ends of the tray platform 106. Thus, the tray platform 106 can be a panel or sheet of material that is generally horizontal or orthogonal relative to the first and second support legs 104a and 104b, such that the first and second support legs 104a and 104b can entirely and solely support the tray platform 106 and objects thereon.

Figure 2:
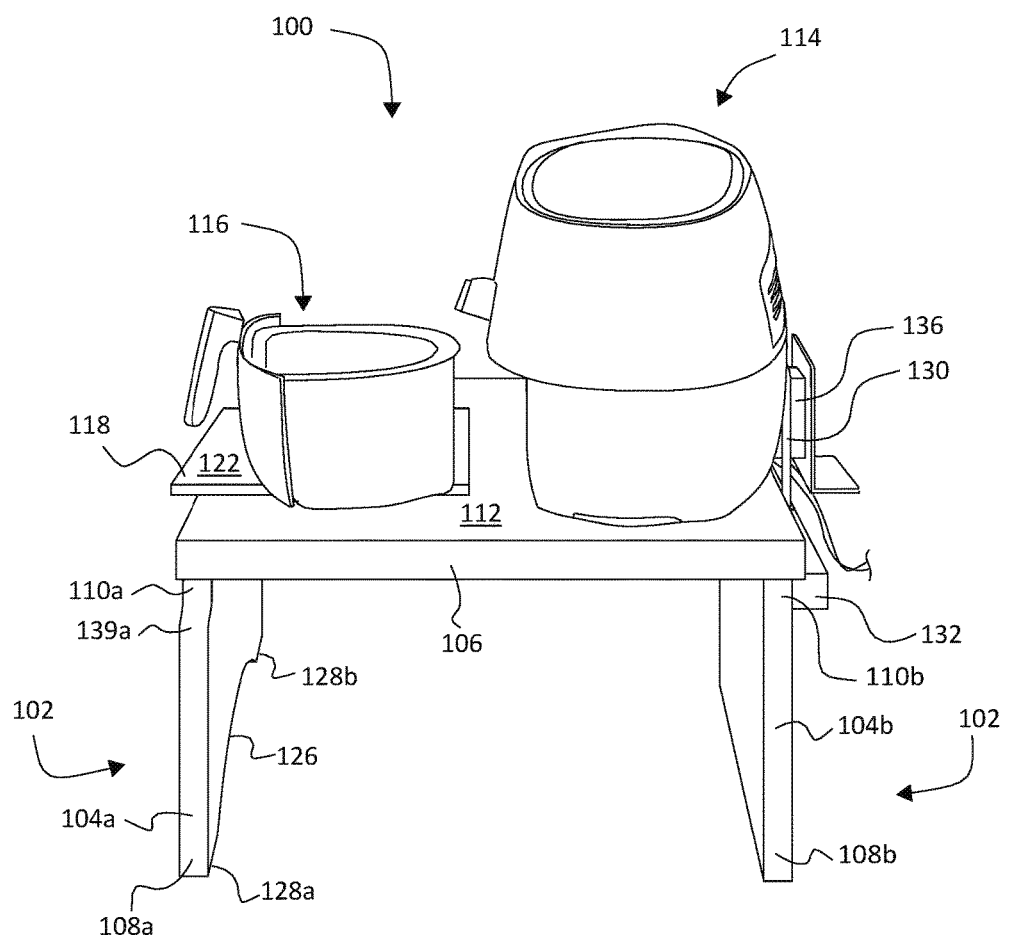
FIG. 2 is a right side perspective view of the tray system of FIG. 1, showing an appliance container of the appliance in an open position and supported by the tray system, in accordance with an embodiment of the present technology.
Figure 3:
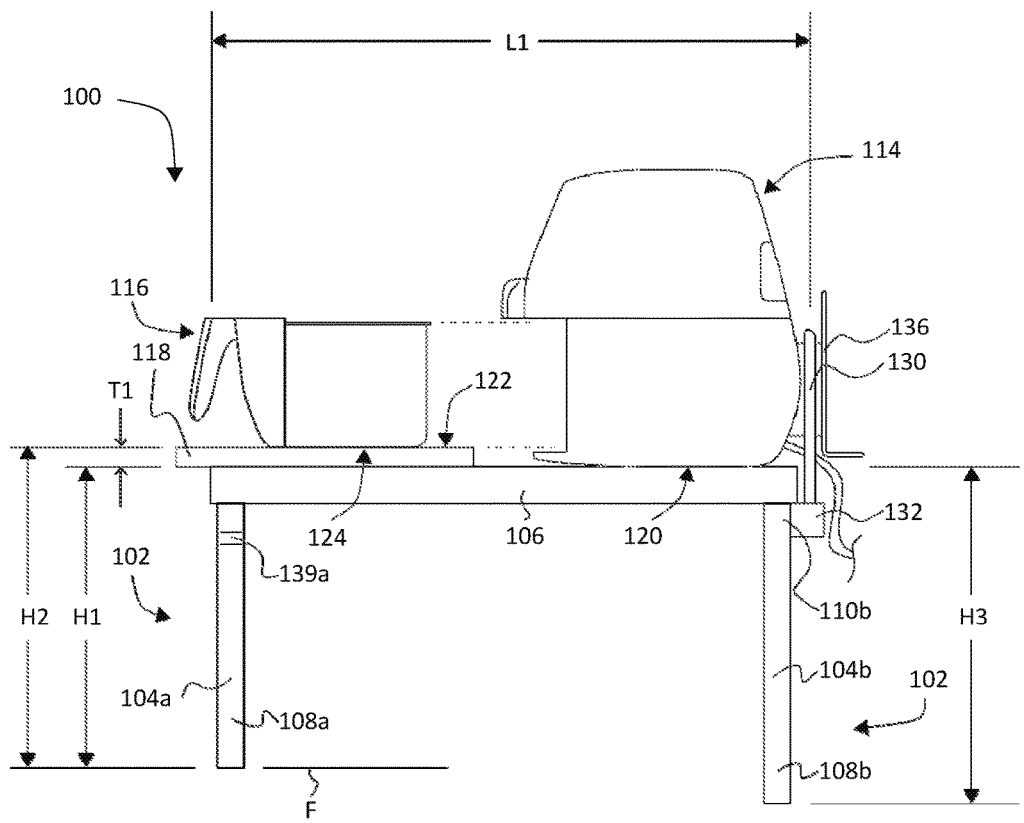
FIG. 3 is a side view of FIG. 2 in accordance with an embodiment of the present technology.

In some examples, the tray platform 106 includes an upper surface area 112 sized and shaped to support an object or appliance 114, such as a food warmer, coffee pot, toaster oven, hot plate, or other food/beverage-related appliance. In one example where the appliance 114 is a food warmer (as shown), the appliance 114 can include a movable compartment 116 that is operable by a user between a closed position (FIG. 1) and an open position (FIGS. 2 and 3). Thus, the upper surface area 112 can include a surface length L1 (FIG. 3) sized to accommodate opening and closing the compartment 116 of the appliance 114 generally along and above the upper surface area 112. More specifically, the tray platform 106 is sized and shaped to have an upper surface length and width, so that when the movable compartment 116 is opened and removed or opened from a housing of the appliance 114, the tray platform 106 can support the movable compartment 116. This may be advantageous when a driver of the vehicle, for instance, can only use one hand to open the compartment 116 and insert food therein, because the other hand may be needed to hold the steering wheel. This also places the compartment 116 at a convenient, accessible area near the appliance 114 and on the same tray platform area so that the user does not need to use another surface area to support the opened compartment 116, such as on the cabin floor or passenger seat, which may be unsanitary or unsafe. Furthermore, the opened compartment 116 may be hot, in examples of being a food warmer (or even a coffee pot), so it is desirable to support the hot compartment at a location that will not risk burning the user or a part of the vehicle.

Figure 6:
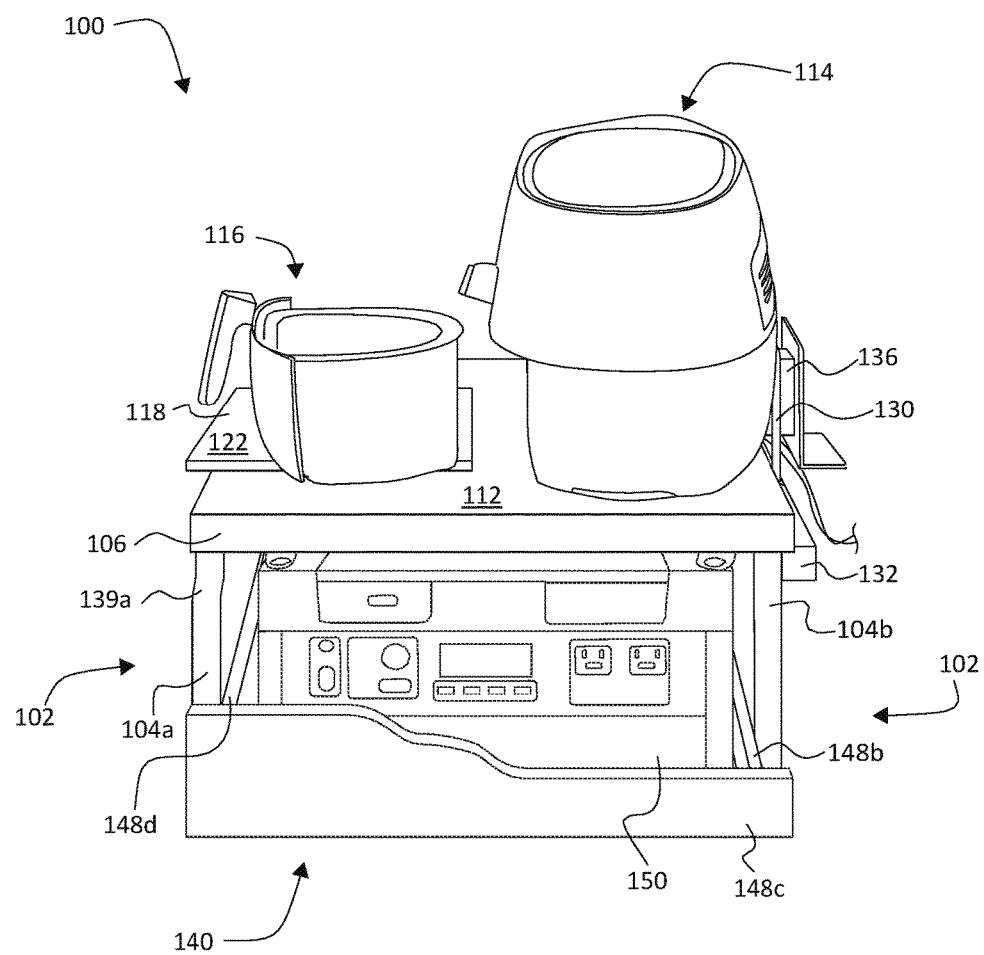
FIG. 6 is a right side perspective view of the tray system of FIG. 2, and including a receiver tray supporting the tray system of FIG. 2, in accordance with an embodiment of the present technology.

In some examples, such as shown in FIGS. 1-7, the tray system 100 can comprise a container support platform 118 supported by or coupled to the tray platform 106. The container support platform 118 can be a separate panel or support member that can be supported about the upper surface area 112 of the tray platform 106. In another example, the container support platform 118 can be formed as part of the tray platform 106. In either scenario, the container support platform 118 can be shaped and sized to slidably support the container 116 when laterally moved away from the appliance 114, as best shown in FIGS. 2, 3, and 6.

More specifically, the tray platform 106 can have a height H1 (FIG. 3) that is at a height above a floor surface F (e.g., a vehicle cabin floor) upon which the first support leg 104a rests. The upper surface area 112 supports a lower portion 120 of the appliance 114 to support a weight of the appliance 114. The container support platform 118 can have a height H2 above the floor surface F, and which is at a height greater than height H1 so that the container support platform 118 is taller than the upper surface area 112. The container support platform 118 can have an upper surface area 122 upon which a lower portion 124 of the container 116 is supported or rests when removed from the appliance 114, as shown in FIG. 3. Thus, the container support platform 118 has a thickness T1 that corresponds to a height at which the container 116 is slidably supported by the appliance 114 above the tray platform 106. In this example, a user can laterally pull-out the container 116 while sliding it along the upper surface area 122 of the container support platform 118, and without substantially vertically lowering or lifting the container 116 relative to its stored position in the appliance 114. Therefore, the container support platform 118 acts as a supporting surface for the container 116 when opened or removed. The container support platform 118 can also serve as a "hot pad" for the container 116. This configuration is desirable when an amount of food is placed in the container 116, because the container support platform 118 can vertically support the weight of the food and the container 116 while the user slides in the container 116 into the housing of the appliance 114 without having to lift or lower the container 116, which could cause strain or fatigue to the user over repeated opening and closing of the container 116. In some examples, the container support platform 118 may extend laterally beyond an end of the tray platform 106, as shown in FIGS. 1-9, to provide an extended platform surface beyond the length of the tray platform 106 to accommodate additional surface space for objects, such as the container 116, without consuming additional cabin floor space. However, the tray platform 106 may be shorter in length and width than shown, while still being able to support the container 116 thereon.

In some examples, the first support leg 104a can comprises a recessed portion 126 formed along a lower surface area about the lower end 108a of the first support leg 104a. As best shown in FIG. 5, the recessed portion 126 can be sized and shaped to rest along a protrusion area P of a cabin floor F of the vehicle. The protrusion area P may be a curved shaped hump (or other shaped protrusion) extending upwardly from surrounding areas of the cabin floor F, such as the case with may vehicles having a transmission hump covering a transmission situated below the cabin floor.

In some examples, the recessed portion 126 is curved or curvilinear, and extends between respective, opposing horizontal or planar surfaces 128a and 128b formed about the lower end 108a of the first support leg 104a. Such opposing horizontal or planar surfaces 128a and 128b are configured to rest along generally flat portions of the cabin floor F on either side of the protrusion area P. The recessed portion 126, and the planar surfaces 128a and 128b, combine to conform or lay evenly along the cabin floor F to prevent the tray system 100 from moving or wobbling from left to right during driving the vehicle. Thus, the recessed portion 126 is sized and shaped to conform over or around a transmission hump to maintain a desired static or stationary position of the tray system 100 while driving.

In some examples, a height of the first support leg 104a is less than a height of the second support leg 104b, which accommodates a possible taller cabin floor area proximate the protrusion area P of the cabin. This is generally illustrated in FIG. 3, showing the rear or second support leg 104b having a height H3 being greater than height H1 of the front or first support leg 104a (in combination with the thickness of the tray platform 106). Such height difference is designed to ensure a horizontal orientation of the tray platform 106 while in the vehicle, because the height of the transmission hump may require a shorter first support leg 104a, for instance.

In a preferred example, as shown in FIG. 5, the first support leg 104a is positioned forward of the tray system 100 and the second support leg 104b is positioned rearward the tray system 100, and are accordingly positioned in the vehicle between the seats, so that during braking of the vehicle, the front support leg 104a tends to resist forward movement of the tray system 100 within the cabin of the vehicle. Similarly, the rear support leg 104b is positioned and shaped to laterally rest upon the cabin floor, so that when accelerating the vehicle the second support leg 104b tends to resist rearward movement of the tray system 100 within the cabin of the vehicle. Thus, the first and second support legs 104a and 104b are formed and positionable in the vehicle in a manner orthogonal to the forward and/or backward velocity or movement of the vehicle to facilitate prevention of the tray system 100 from moving forward or backward when driving.

Figure 4:
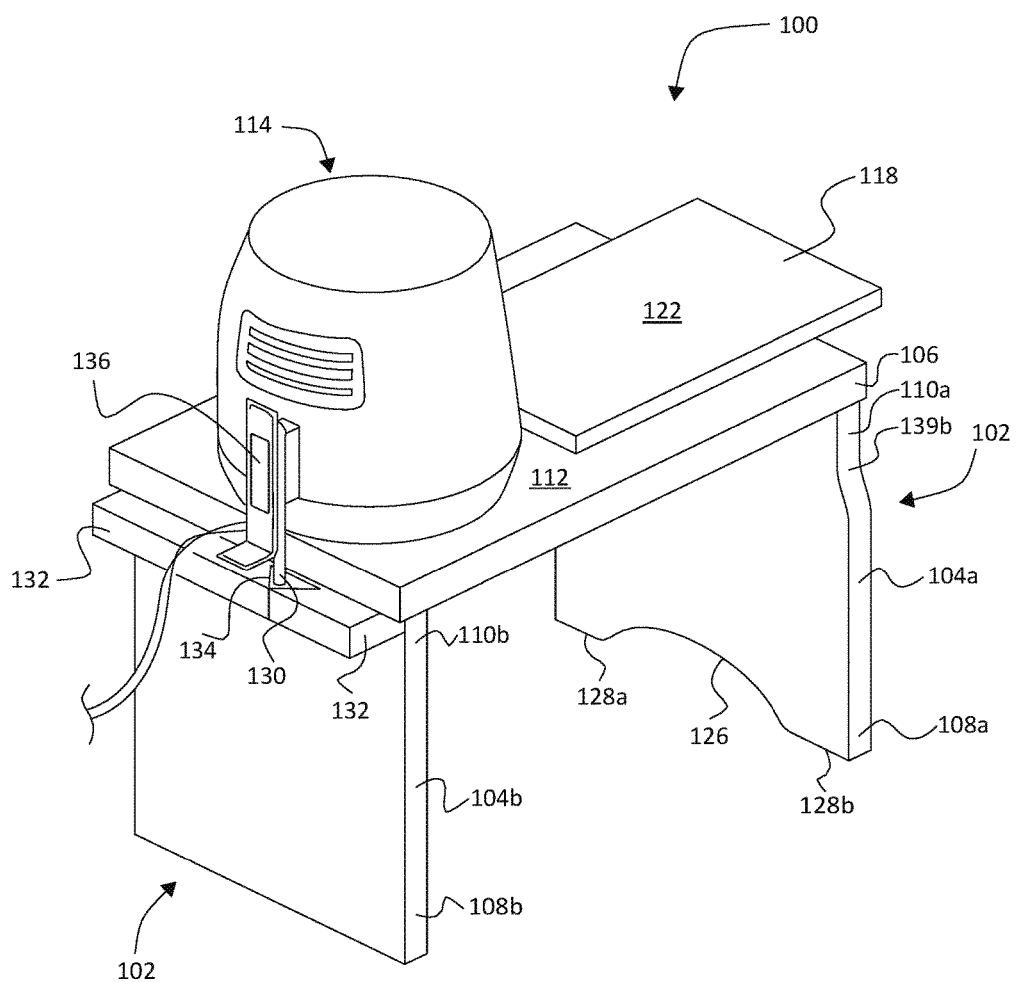
FIG. 4 is a rear left perspective view of the tray system of FIG. 1 in accordance with an embodiment of the present technology.

In some examples, the tray system 100 can comprise a fastening device 130 supported by the tray platform 106. The fastening device 130 may be a threaded metal hook or other movable fastening device that is coupled to the tray platform 106, or to another support component, such as a fastener support member 132 coupled to the tray platform 106, as shown in FIG. 4. In one example where the fastening device 130 is a threaded metal hook, the fastening device 130 is operable to removably attach the appliance 114 to the tray platform 106 (and to the tray system 100). Thus, a lower threaded end of the fastening device 130 may be disposed through a coupler 134 (FIG. 4), and a threaded nut (not shown) can be threaded to the lower threaded end on the lower side of the coupler 134, and the other end of the fastening device 130 can be a hook that wraps around a mounting portion 136 of the appliance 114. Therefore, a user can remove the threaded nut from the fastening device 130, and the hook end can be freed from the mounting portion 136 of the appliance 114 to remove the appliance from the tray system 100. The fastening device 130 is therefore provided to securely attach the appliance 114 to the tray system 100 to restrict its movement during driving. Other attachment devices can be utilized, such as an elastic cord coupled to the tray platform 106, or other suitable device operable by a user to removably couple an object or appliance to the tray platform 106.

In some examples, a lateral or horizontal width of the first support leg 104a is greater than a lateral width of the second support leg 104b, which accommodates the second or rear support leg 104b to fit between a rear area of the vehicle seats (which may be narrower than a front area between the seats). This is generally illustrated in FIG. 4, showing the second support leg 104b being slightly narrower that the width of the first support leg 104a.

In some examples, sides of the upper end 110a of the first support leg 104a can comprise respective recessed portions 139a and 139b, which can have a profile that is curved, linear, chamfered, etc. Each recessed portion 139a and 139b can transition downwardly from proximately a lower side of the tray platform 106, and from a narrow section to a wider section proximate respective sides of the upper end 110a of the first support leg 104a (FIG. 5). Thus, the upper end 110a can have a width smaller than a width of the lower end 108a of the first support leg 104a. Having a wider lower end or area of the first support leg 104a can provide a tighter fit between a front area of the seats while still allowing clearance of the upper end 110a of the first support leg 104a. This clearance area can also allow free passage of a stick shift of the vehicle transmission. With reference to FIG. 5, in instances where the side cushion area of the seats tend to "sandwich" the first support leg 104a (due to this wider area below the upper end 110a), the tray system 100 can be restricted from lateral movement within the vehicle, such as when turning the vehicle left or right.

Figure 7:
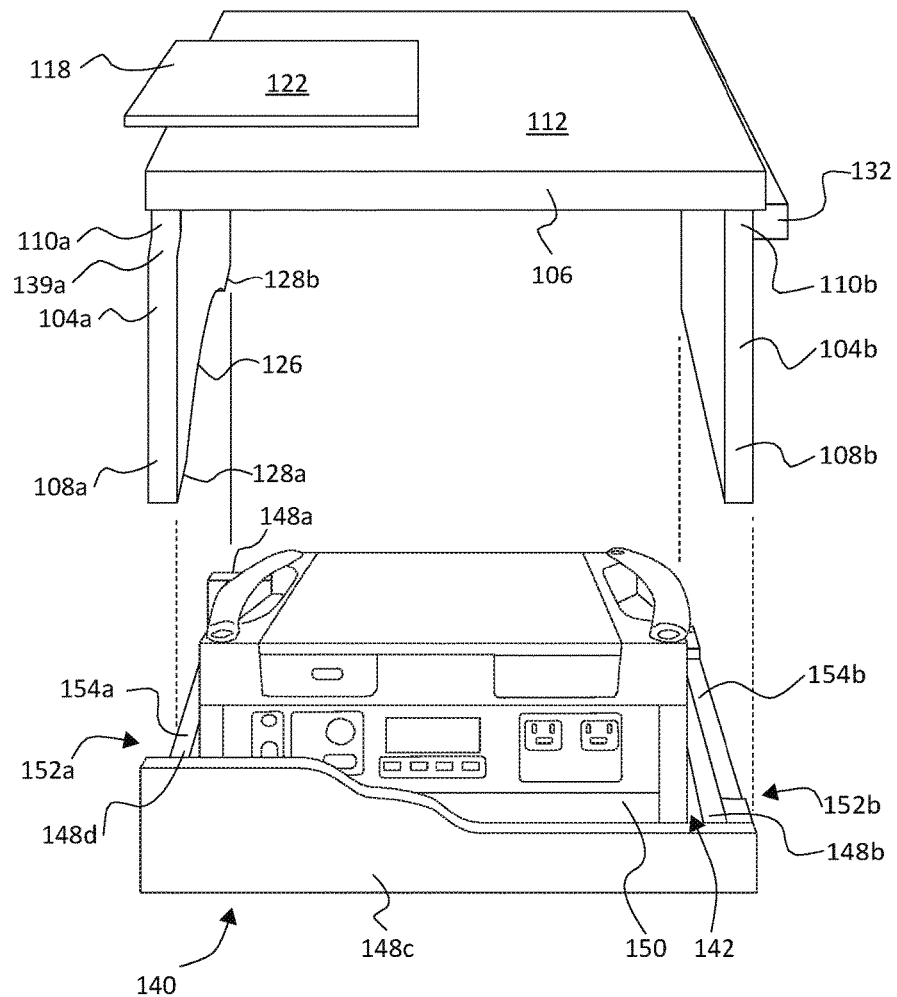
FIG. 7 is a right side perspective view of the tray system of FIG. 5 being exploded upwardly from the receiver tray in accordance with an embodiment of the present technology.

With continued reference to FIGS. 6-8, the tray system 100 can further comprise a receiver tray 140 situated below the tray platform 106. The receiver tray 140 can be sized and shaped to receive and support the tray support base 102 (i.e., the first and second support legs 104a and 104b), as further detailed below. In some aspects, the first and second support legs 104a and 104b can be removably coupled to or interfaced to the receiver tray 140. In this manner, the first and second support legs 104a and 104b (and the tray platform 106) can be vertically lifted away from the receiver tray 140 when desired, such as for purposes of accessing a compartment area 142 of the receiver tray 140.

Figure 8:
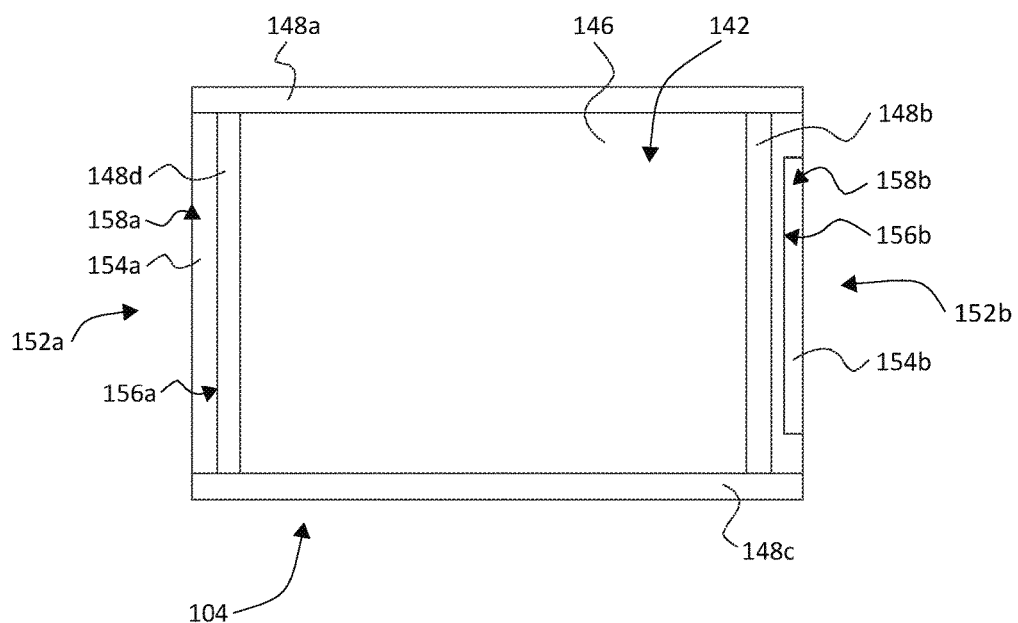
FIG. 8 is a top view of the receiver tray of FIG. 7 in accordance with an embodiment of the present technology.
Figure 9:
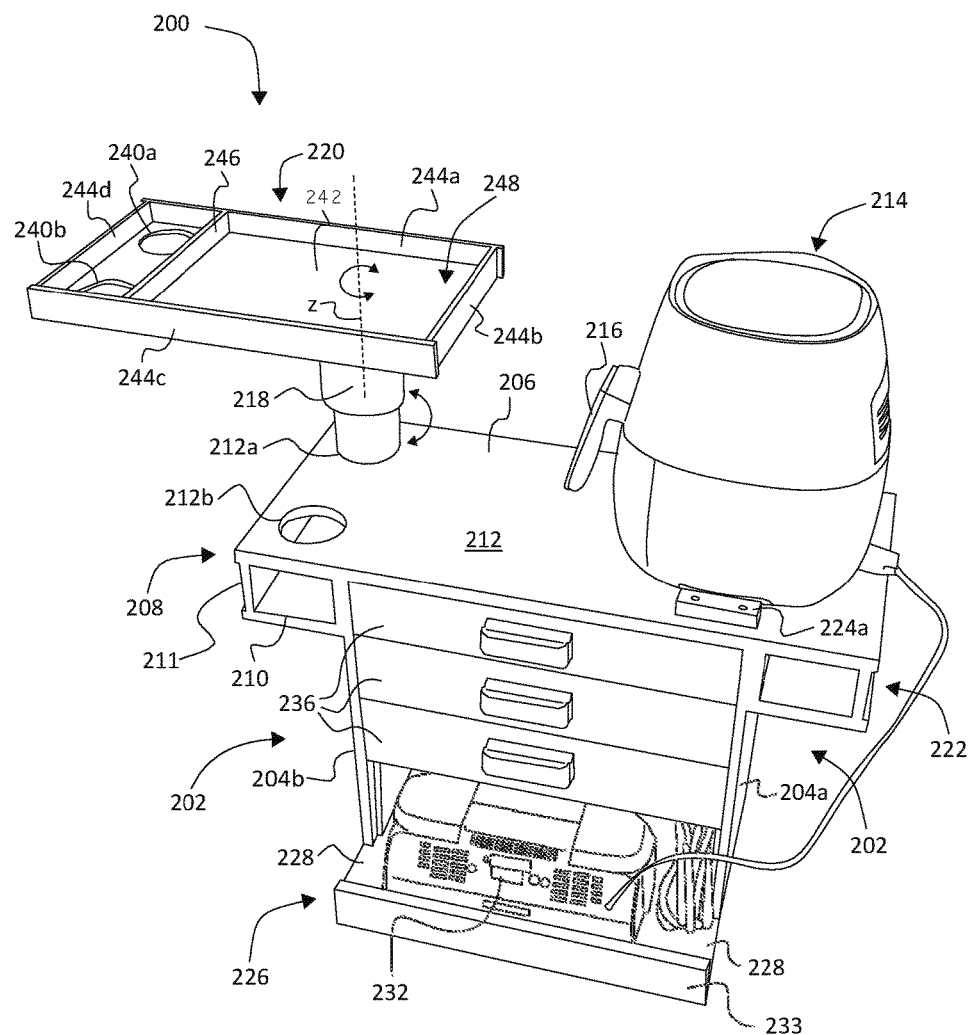
FIG. 9 is a front side perspective view of a tray system, supporting an appliance and an electronics device, in accordance with an embodiment of the present technology.

The compartment area 142 can be defined by a lower panel 146 and a plurality of vertical side walls 148a-d that are coupled to a perimeter area about the lower panel 146 (see e.g., FIG. 8, showing a top down view of the receiver tray 140). The lower panel 146 may rest against the cabin floor of the vehicle. The compartment area 142 can be sized and shaped to receive and support a portably power source 150 for powering the appliance 114, for instance. Thus, in one example, the user can lift upwardly the tray support base 102 and the tray platform 106 to gain access to the portable power source 150 within the receiver tray 140, such as to remove it from the receiver tray 140.

In some examples, the receiver tray 140 can comprise a front receiving interface area 152a and a rear receiving interface area 152b. The front receiving interface area 152a can be configured to receive, and at least partially support, the first support leg 104a of the tray support base 102. Likewise, the rear receiving interface area 152a can be configured to receive, and at least partially support, the second support leg 104b of the tray support base 102. More specifically, the front receiving interface area 152a can comprise a recessed support portion 154a sized and shaped to interface with the lower end 108a of the first support leg 104a. The recessed support portion 154a can comprise a vertical interface surface 156a that extends upwardly (e.g., orthogonally) from a horizontal support surface 158a. The horizontal support surface 158a can interface with and support the lower end 108a of the first support leg 104a, and the vertical interface surface 156a can slidably interface with an inner surface of the first support leg 104a. In this manner, the vertical interface surface 156a can be biased against the first support leg 104a to restrict or limit rearward movement of the first support leg 104a during driving the vehicle, such as when accelerating or driving up-hill.

Similarly, the rear receiving interface area 152b can comprise a recessed support portion 154b sized and shaped to interface with the lower end 108b of the second support leg 104b. The recessed support portion 154b can comprise a vertical interface surface 156b that extends upwardly (e.g., orthogonally) from a horizontal support surface 158b. The horizontal support surface 158b can interface with and support the lower end 108b of the second support leg 104b, and the vertical interface surface 156b can slidably interface with an inner surface of the second support leg 104b. In this manner, the vertical interface surface 156b can be biased against the second support leg 104b to restrict or limit rearward movement of the second support leg 104b during driving the vehicle, such as when braking or driving downhill. Thus, collectively, the front and rear receiving interface areas 152a and 152b can cooperatively restrict forward and rearward movement of the tray support base 102 and the tray platform 106, which helps to properly position the tray system 100, and to prevent the appliance 114 from tipping or falling off the tray platform 106.

In some examples, the first and second support legs 104a and 104b can be permanently attached to the receiver tray 140 about respective front and rear receiving interface areas 152a and 152b. In another example, the front and rear receiving interface areas 152a and 152b may not have recessed portions; rather, the front side wall 148b and the rear side wall 148d can act as vertical interface surfaces that slidably receive and laterally support respective first and second support legs 104a and 104b, so that the first and second support legs 104a and 104b are directly supported by the cabin floor.

In some examples, ends of both of the left and right side walls 148a and 148c can extend beyond the points at which they are attached to the front and rear side walls 148b and 148d, which can assist to laterally support the first and second support legs 104a and 104b to prevent side-to-side movement of the support legs when turning the vehicle, for instance. In some examples, the first and second support legs 104a and 104b can be slidably interfaced to an inner surface of respective side walls 148b and 148d, which can also assist to restrict forward and rearward movement of the first and second support legs 104a and 104b.

In examples where a vehicle does not have a protrusion area (e.g., transmission hump), the receiver tray 140 can be used to maintain a level or horizontal orientation of the tray platform 106 (in examples where the first support leg 104a is shorter than the second support leg 104b). In this manner, the front receiving interface area 152a can be configured at a height to accommodate for the shorter first support leg 104a.

In some examples, the compartment area 142 of the receiver tray 140 can have a variable area from front to back. Specifically, one end of the side walls 148a and 148c can be shorter or have less height than a height toward the other end or rear end of the side walls 148a and 148c, as shown in FIGS. 6 and 7. This can assist to maintain objects within the compartment area 142 and prevent them from sliding or falling out of the receiver tray 140. The shorter height sections of the side walls 148a and 148c can also assist to provide sufficient clearance for a user to reach in and access (or insert/remove) objects supported by the receiver tray 140 without having to entirely remove the support base 102 and the tray platform 106 from the receiver tray 140.

Reference to a particular spatial or gravitational orientation of certain components of the tray system 100 are not meant to be limiting, such as when referencing "rear" or "front" or "lower" or "upper" or "vertical" or "horizontal" of components of the tray system 100 (and of tray system 200 discussed below). However, generally the tray system 100 is intended to be oriented in a vertical manner in a cabin of a vehicle, as shown in FIG. 5, such that the first support leg 104a is oriented forward of the cabin while the second support leg 104b is oriented more rearward of the cabin relative to the first support leg 104a.

As illustrated in FIGS. 10-15, a tray system (or apparatus or assembly), indicated generally at 200, in an example implementation in accordance with the technology is provided for use in a vehicle and capable of carrying or supporting appliance(s), food, beverages, and any of a variety of other items. The tray system 200 may be formed of any of a variety of different materials including, but not limited to, wood, plastic, metal, composite and other materials and combinations thereof. The formation and/or assembly of the tray system may be performed using any of a variety of technologies as may be understood by one having skill in the art. For example, a wood tray system may be created by carving the tray from a single piece of wood or may be assembled by gluing, stapling, nailing press-fitting and so forth.

Figure 10:
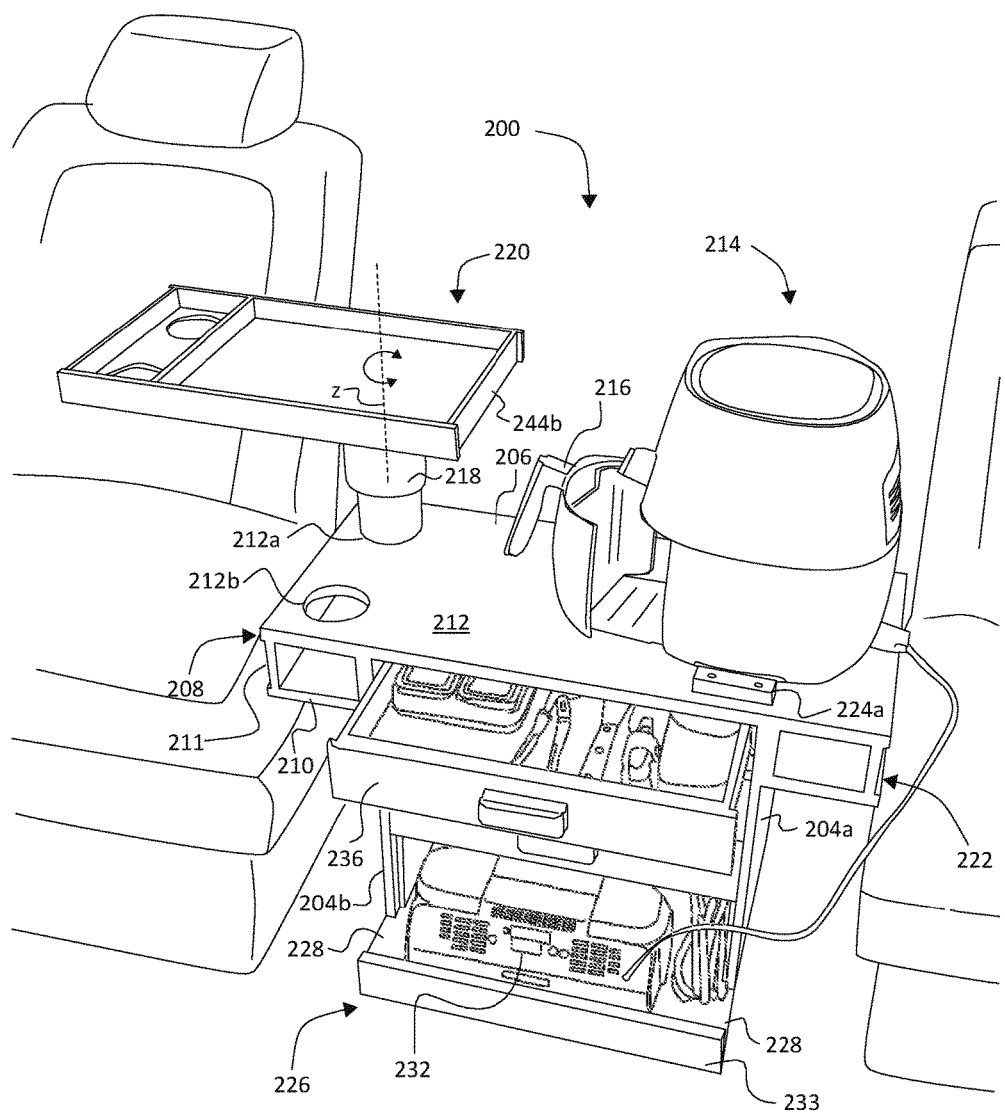
FIG. 10 is a front side perspective view of the tray system of FIG. 9 positioned between a pair of vehicle seats in accordance with an embodiment of the present technology.

In one example, the tray system 200 comprises a tray support base 202 sized and shaped to fit between front seats of a vehicle (i.e., FIG. 10). Note that the tray support base 202 can be rotated from the view of FIG. 10 and positioned between seats in any orientation, or it can be simply positioned in the sleeping/living quarters of a cabin of a vehicle, such as may be used in a tractor trailer. The tray support base 202 can comprise a first side wall 204a and an opposing second side wall 204b. The first and second side walls 204a and 204b can be generally vertical support panels that partially define the tray support base 202 being a cabinet, in one example. The tray support base 202 can further comprise a third side wall 204c (FIGS. 12 and 13) extending between the first and second side walls 204a and 204b. The first, second, and third side walls 204a-c can support a tray platform 206, which can be a generally planar horizontal panel or platform.

The tray platform 206 can comprise an upper surface area 212 sized and shaped to support an appliance 214, such as a food warmer, coffee pot, toaster oven, hot plate, or other food/beverage-related appliance. In one example where the appliance 214 is a food warmer, the appliance 214 can include a movable compartment 216 that is operable by a user between a closed position (FIG. 9) and an open position (FIG. 10). Thus, the upper surface area 112 can include a surface length L2 (FIG. 11) sized to accommodate opening and closing the compartment 216 of the appliance 214 generally along and above the upper surface area 212 (or directly slidable along the upper surface area 212). The surface length L2 is provided at a distance or length sufficient to underlie the container 216 when pulled out from the appliance 214, so that the container does not hang over an edge of the tray platform 206, therefore being prone to being bumped or knocked over by a user or passenger.

In another example, the tray system 200 can comprise a container support platform (e.g., like 118 of FIG. 1), to accommodate removable containers from an appliance, such in FIG. 2. In this example, such container support platform can have the same or similar configuration as in FIG. 1, along with the same or similar advantages of inclusion of a container support platform supported by the tray platform 206 of FIG. 9.

In some examples, the tray support base 202 can comprise a beverage container support portion 208 that is laterally cantilevered outwardly beyond the second side wall 204b. The beverage container support portion 208 can at least partially define a portion of the tray platform 206 (and the upper surface area 212). In one aspect, the beverage container support portion 208 can have a lower beverage support panel 210 substantially parallel to the tray platform 206 for supporting beverages. The beverage container support portion 208 can further comprise a side wall 211 extending orthogonally from the beverage support panel 210, and that is coupled to an end of the tray platform 206. The beverage container support portion 208 can include a pair of cup holders 212a and 212b (e.g., circularly shaped recesses or apertures) formed through an end area of the tray platform 206 for supporting a variety of cups, cans, etc. One of the cup holders 212a can support a base 218 and a tray 220, as further detailed below.

In some examples, the tray system 200 can further comprise an object support portion 222 that is laterally cantilevered outwardly beyond the first side wall 204a (opposite the beverage container support portion 208). The object support portion 222 can at least partially define a portion of the tray platform 206 (and the upper surface area 212). The object support portion 222 can be formed outwardly from the first side wall 204a to further define the length L2 of the tray platform 206 to accommodate supporting objects, such as the appliance 214. Thus, because of the outwardly, laterally extending configuration of the beverage container support portion 208 and the object support portion 222, the length L2 is greater than a width defined between the first and second side walls 204a and 204b, so that the tray support base 202 can fit between seats, but that the upper surface area 212 is longer than the width of the tray support base 202 to accommodate supporting additional objects thereon (or to generate a greater surface area for eating thereon), and while not consuming additional floor space. The object support portion 222 can have the same or similar features as the beverage container support portion 208 (even a cup holder).

In some examples, the tray system 200 can further comprise one or more appliance support members 224a and 224b attached to the tray platform 206 above the upper surface area 212. The appliance support members 224a and 224b can be glued or fastened or otherwise attached to opposing sides the tray platform 206 at positions that correspond to a lower width of the appliance 214. The appliance support members 224a and 224b can be configured to position, and maintain the position of, the appliance 214 to prevent tipping or falling off the tray platform 206. Additional similar support members can be provided, such that the appliance 214 can be surrounded on all sides by such support members to maintain the position of the appliance.

Figure 11:
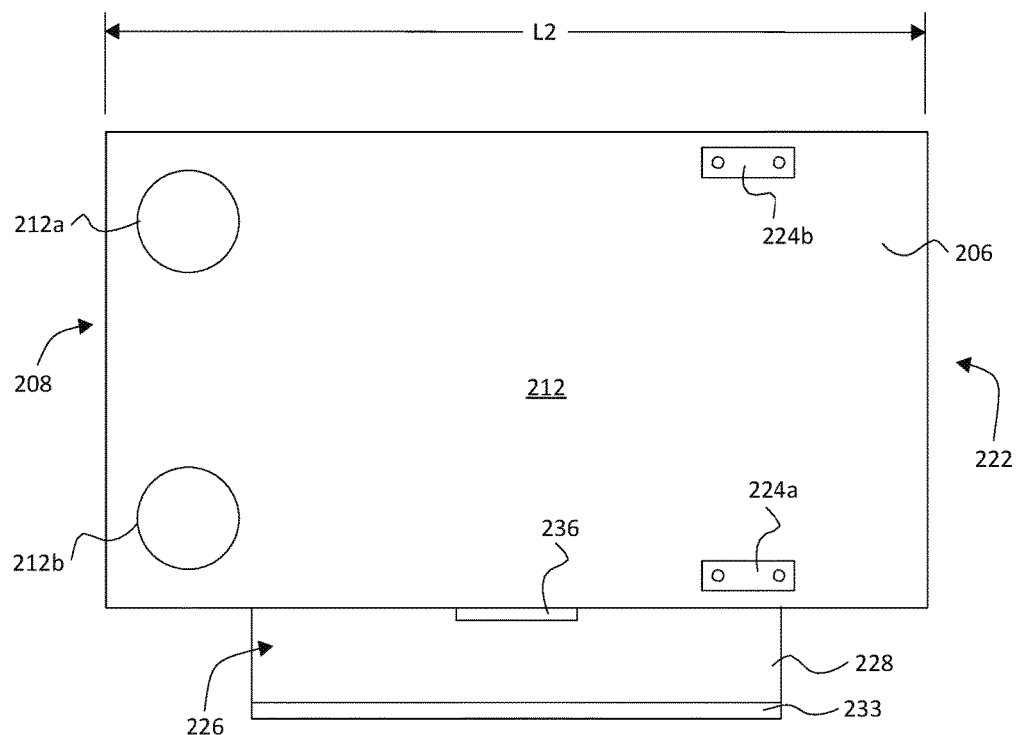
FIG. 11 is a top view of the tray system of FIG. 10, without supporting the appliance, in accordance with an embodiment of the present technology.
Figure 12:
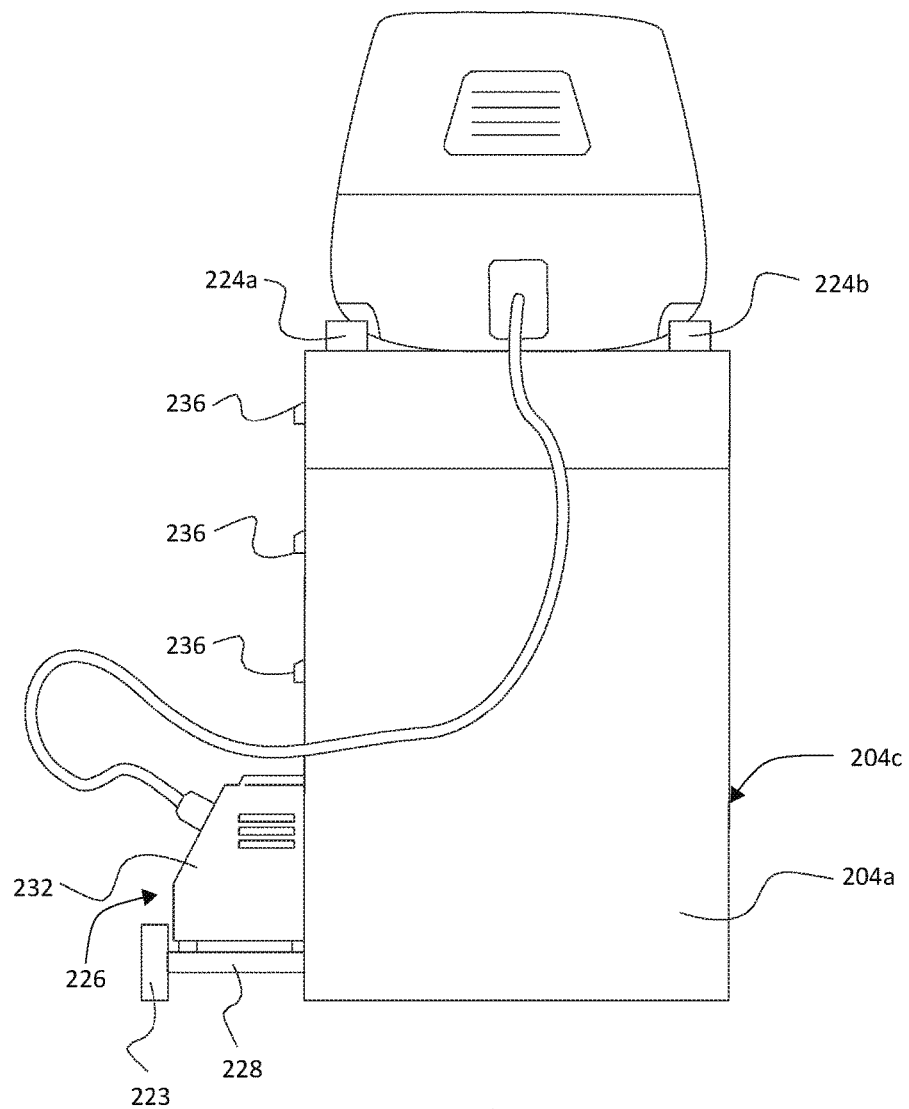
FIG. 12 is a side view of the tray system of FIG. 9 in accordance with an embodiment of the present technology.

In some examples, the tray system 200 can further comprise a compartment 226 positioned at a lower area of the tray support base 202 (and can at least partially define the tray support base 202). The compartment 226 can comprise a lower support panel 228 extending generally horizontal and coupled at respective sides to the first, second, and third side walls 204a-c. The compartment 226 can be sized and shaped to support an object 232, such as an electronics device, such as a portable power source for powering the appliance 214. In one aspect, the lower support panel 228 can extend outwardly from a width of the tray platform 206 (and outwardly from the first and second side walls 204a and 204b), which is best shown in FIGS. 11 and 12. The compartment 226 can comprise a retainer flange 233 that extends orthogonally and upwardly from the lower support panel 228, which helps to retain the object 232 within an area defined by the compartment 226. The lower support panel 228 being shaped to extend outwardly, as mentioned above, can provide sufficient clearance for a user to access (or insert/remove) the object 232.

Figure 13:
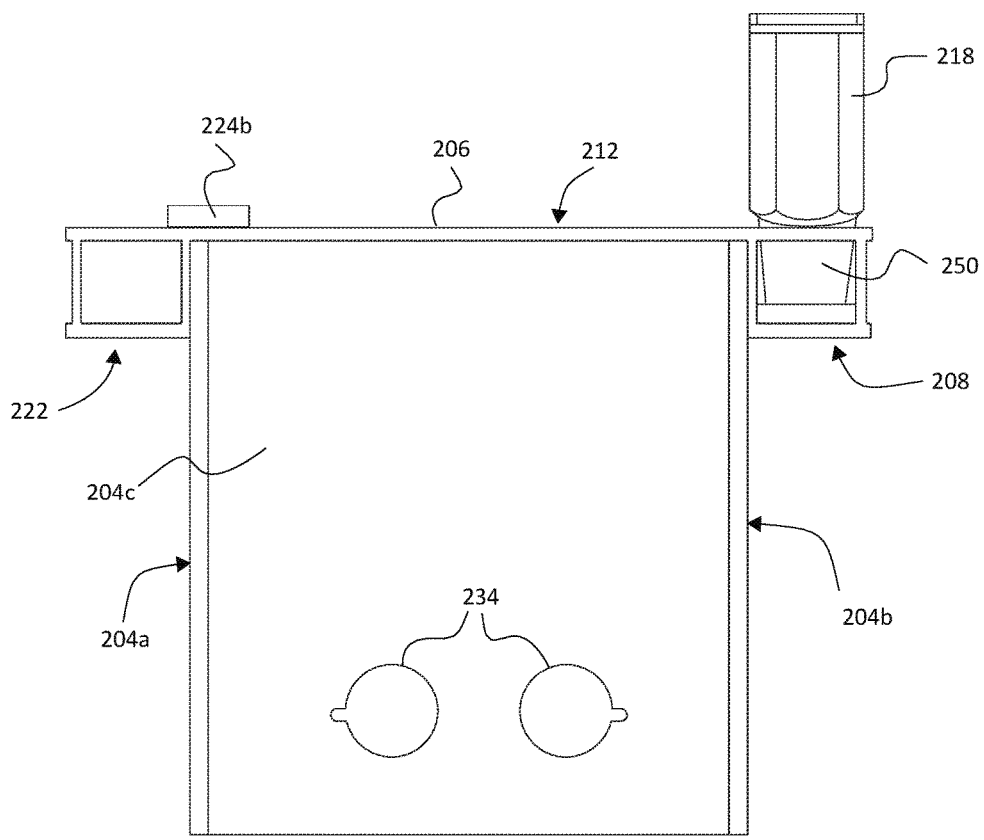
FIG. 13 is a rear view of the tray system of FIG. 9, without supporting the appliance, and supporting a removable base, in accordance with an embodiment of the present technology.

In one example, with reference to FIG. 13, the third panel 204c can comprise at least one aperture 234 to permit passage of electronic cords from the object 232. This promotes safety to prevent users from tripping over the cords because it positions the cords away from a front area of the tray system (the front where the user may insert/remove the object 233).

In some examples, the tray system 200 can comprise at least one drawer 236 (e.g., three drawers stacked as shown) slidably supported by the tray support base 202. The drawers 236 can be nearly as wide as the width between the first and second side walls 204a and 204b to maximize drawer space. The drawers 236 can be vertically situated between the tray platform 206 and the compartment 226.

With continued reference to the base 218 and the tray 220, the base 218 can be removably supported by and coupled to the cup holder 212a, and the tray 220 can be slidably and removably coupled to the base 218. Because the base 218 is generally circular at its lower end, the base 218 and the tray 220 can be rotatably movable relative to the tray platform 206 about a central axis Z (FIGS. 1 and 2) while being supported in the cup holder 212a. The central axis Z can be generally orthogonal to a plane of the upper surface area 212 of the tray platform 206. Thus, a user can pivot or rotate the tray 220, which concurrently rotates the base 218 about axis Z, so that the tray 220 can be rotated to a first position to "hover" over the lap of a user when desired (as in FIG. 1), and then rotated to a second position away from the user when desired (i.e., positioned generally over the tray platform 206), so that the user can stand up and get out of the vehicle without impacting the tray 220, or without removing the tray 220 from the base 218, for instance.

In some examples, the tray 220 can have at least one cup holder 240a and 240b for supporting a beverage container. The tray 220 can have a lower support panel 242 that is circumscribed by side walls 244a-d that extend vertically or orthogonally from the lower support panel 242, which defines a perimeter container area of the tray 220. A partition panel 246 can be coupled to the lower support panel 242 adjacent the cup holders 240a and 240b to maintain objects supported in a compartment 248 of the tray 220.

Figure 14:
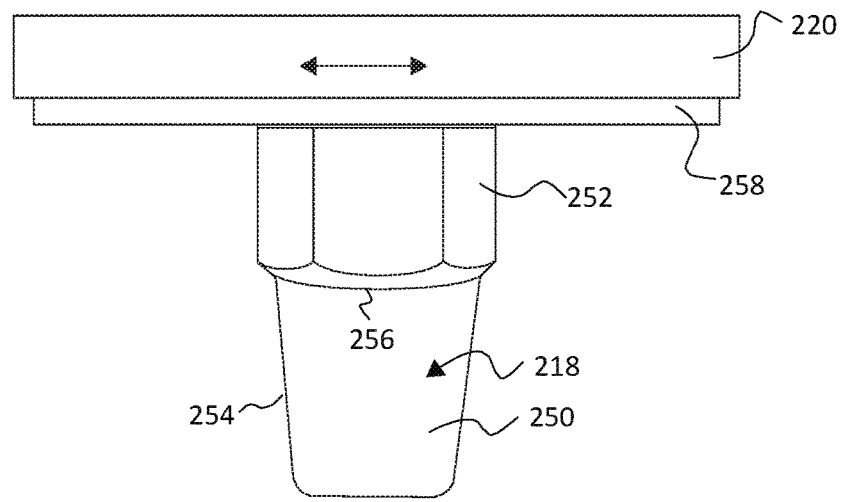
FIG. 14 is a rear view of the tray system of FIG. 9, without supporting the appliance, and supporting a removable base, in accordance with an embodiment of the present technology.
Figure 15:
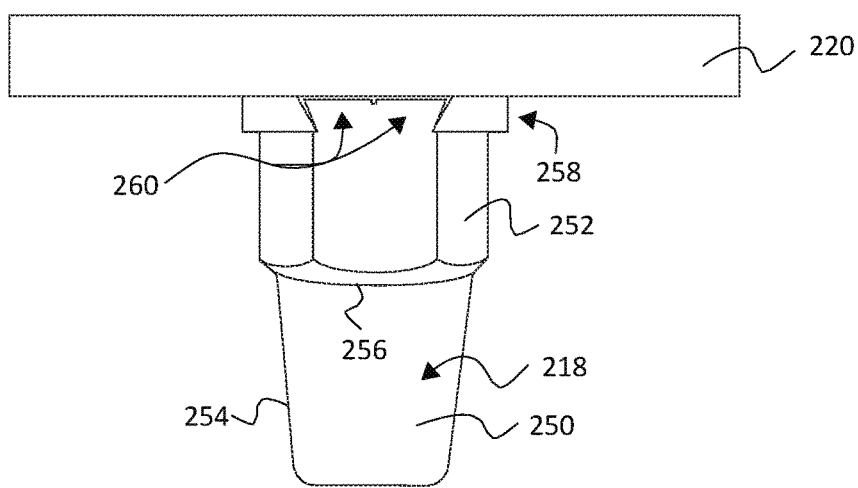
FIG. 15 is a side view of the removable base of the tray system of FIG. 14, and a tray slidably supported by the removable base, in accordance with an embodiment of the present technology.

As illustrated by the side views of FIGS. 14 and 15, the tray 220 may be slidably coupled to the base 218, so that the position of the tray 220 can be varied, and/or so that the tray 220 can be entirely removed from the base 218 when desired. The base 218 and the tray 220 can have the same or similar features as described with the similar components of U.S. patent application Ser. No. 14/183,053, filed Feb. 18, 2014, which is incorporated by reference herein.

Specifically, the base 218 may include a lower portion 250 and a shoulder portion 252. The lower portion 250 may have a circular cross-sectional shape and the shoulder portion 252 may have a polygonal cross-sectional shape. The shapes of the lower portion 250 and shoulder portion 252 may be configured in any suitable shape, however, and may differ from those illustrated or described. However, a circular shape for the lower portion 250 may be preferable in order to maximize occupancy of the lower portion within the circular cup holder 212a, which may increase the degree of securement of the lower portion within the cup holder. The polygonal cross-sectional shape of the shoulder portion 252 may be configured to support the tray 220, while also providing a grippable surface and attractive design.

The shoulder portion 252 of the base 218 may have a greater cross-sectional width than the lower portion 250. The lower portion 250 may be tapered with a taper 254. The base 218 may further include a tapered transition portion 256 transitioning from the circular cross-sectional shape to the polygonal cross-sectional shape with the greater cross-sectional width. For example, the tapered transition portion 256 may be rounded and tapered as illustrated. The rounded taper may be shaped to approximate the shape of an edge of a sphere superimposed between the lower portion and the shoulder portion with a central axis through the sphere aligned with a vertical central axis of the base, where the spherical shape is represented on the tapered portion 256 alone without extending to the lower portion 250 or the shoulder portion 252.

The lower portion 250 of the base 218 may be sized and shaped to fit within the cup holder 212a in the tray platform 206. While the present technology may be implemented using a single base 218 to support the tray 220, the technology may be available as a kit including a plurality of bases, such as further exemplified in U.S. patent application Ser. No. 14/183,053, filed Feb. 18, 2014, which is incorporated by reference herein.

The tray 220 may include a track 258 formed in a bottom of the tray 220 or attached to the bottom of the tray 220. The tray 220 may be slidably attachable to the base 218 along the track 258. For example, the base 218 may include a track insert 260 sized and shaped to fit within the track 258. The track 258 may have one or more open ends for receiving the track insert 260. The track 258 and the track insert 260 may be dovetailed to fit together by inserting the track insert into an open end of the track. In other words, sides of the track insert 260 and the track 258 may extend at an oblique angle with respect to a top of the base 218 or the bottom of the tray 220, respectively. In other words, the inner sides of the track 258 may be dovetailed or in a dovetail configuration. Other configurations may include a T-cut shape, a squared shape, or any other suitable configuration. It is noted that a shape of the base 218, or at least a portion of the base configured to interface with the track 258, may be sized and shaped to interface with the track 258 based on a size and shape of the track 258, including the sides of the track 258. The tray 220 may include a plurality of tracks. The plurality of tracks may be parallel or perpendicular to one another.

In one example, a single base 218 may be used to support the tray 220. However, in some examples, a plurality of bases may be secured in one or more tracks and may be positioned in a plurality of cup holders to better support the tray. The plurality of bases may be selected to have a same or different height, depending on the relative heights of the plurality of cup holders.

Reference has been made to the examples illustrated in the drawings, and specific language was used herein to describe the same. It will nevertheless be understood that no limitation of the scope of the technology is thereby intended. Alterations and further modifications of the features illustrated herein, and additional applications of the examples as illustrated herein, which would occur to one skilled in the relevant art and having possession of this disclosure, are to be considered within the scope of the description.

Furthermore, the described features, structures, or characteristics may be combined in any suitable manner in one or more examples. In the preceding description, numerous specific details were provided, such as examples of various configurations to provide a thorough understanding of examples of the described technology. One skilled in the relevant art will recognize, however, that the technology may be practiced without one or more of the specific details, or with other methods, components, devices, etc. In other instances, well-known structures or operations are not shown or described in detail to avoid obscuring aspects of the technology.

Although the subject matter has been described in language specific to structural features and/or operations, it is to be understood that the subject matter defined in the appended claims is not necessarily limited to the specific features and operations described above. Rather, the specific features and acts described above are disclosed as example forms of implementing the claims. Numerous modifications and alternative arrangements may be devised without departing from the spirit and scope of the described technology.

The invention claimed is:

1. A tray system for use in a vehicle, comprising:
a tray support base sized and shaped to fit between seats of a vehicle;
a tray platform supported by the tray support base, the tray platform having an upper surface area sized and shaped to support an appliance, the upper surface area having a length sized to accommodate opening and closing a compartment of the appliance about the upper surface area; and
a receiver tray situated below the tray platform, the receiver tray sized and shaped to receive and support the tray support base, the tray support base being removably interfaced to the receiver tray; wherein
the tray support base comprises a first support leg and a second support leg supporting the tray platform, the first support leg positionable forward of a cabin of the vehicle, and the second support leg positionable rearward of the first support leg; and
the first support leg comprises a recessed portion formed along a lower end of the first support leg, the recessed portion sized and shaped to rest along a protrusion area of a cabin floor of the vehicle.

2. The tray system of claim 1, wherein the recessed portion comprises a curved profile, and wherein the lower end of the first support leg comprises opposing planar surfaces formed on either side of the recessed portion, the opposing planar surfaces configured to rest on the cabin floor of the vehicle.

3. The tray system of claim 1, further comprising a fastening device supported by the tray platform, the fastening device operable to removably attach the appliance to the tray platform.

4. The tray system of claim 1, further comprising a container support platform supported by the tray platform, the container support platform shaped and sized to slidably support a container removable from the appliance.

5. The tray system of claim 1, wherein the receiver tray comprises a lower panel configured to rest against a cabin floor of the vehicle, the receiver tray having a front receiving interface area and a rear receiving interface area, the front receiving interface area operable to receive and at least partially support a front support leg of the tray support base, and the rear receiving interface area operable to receive and at least partially support a rear support leg of the tray support base.

6. The tray system of claim 5, wherein the front receiving interface area comprises a first vertical interface surface interfaced to an inner surface of the front support leg, and the rear receiving interface area comprises a second vertical interface surface interfaced to an inner surface of the rear support leg, the first and second biasing surfaces configured to restrict the tray support base from forward or rearward movement during movement of the vehicle.

7. The tray system of claim 1, wherein the tray support base comprises a first side wall and an opposing second side wall, the first and second side walls supporting the tray platform, the tray platform comprising a beverage container support portion extending outwardly from the first side wall.

8. The tray system of claim 7, further comprising a base receivable into a cup holder of the beverage container support portion, and further comprising a tray coupled to the base.

9. The tray system of claim 8, wherein the beverage container support portion comprises at least one circularly shaped recess formed through a bottom of the tray, the at least one circularly shaped recess being sized to receive a beverage container.

10. The tray system of claim 8, wherein the tray and the base are rotatable about a central axis of rotation of the base orthogonal to a planar surface of the tray platform.

11. The tray system of claim 1, further comprising at least one appliance support member attached to the tray platform, the appliance support member sized and shaped to laterally support the appliance from movement relative to the tray platform.

12. The tray system of claim 1, further comprising at least one compartment supported by the tray support base, and sized and shaped to support a portable power source device for powering the appliance.

13. The tray system of claim 1, further comprising at least one drawer slidably supported by the tray support base, the at least one drawer operable to be opened forward of the tray support platform and between seats of the vehicle.

14. The tray system of claim 13, wherein the at least one drawer comprises at least three drawers arranged in a stacked manner.

15. A tray system for use in a vehicle, comprising:
a tray support base comprising a first support leg and a second support leg, the first support leg comprising a recessed portion formed along a lower end, the recessed portion being sized and shaped to rest along a protrusion area of a cabin floor of the vehicle;

a tray platform supported by the first and second support legs;

a fastening device operable to removably attach an appliance to the tray platform;

a container support platform supported by the tray platform, the container support platform sized and shaped to support a container removable from the appliance; and a receiver tray supporting the first and second support legs, the tray support base being removably interfaced to the receiver tray.

16. A tray system for use in a vehicle, comprising:

a tray support base, the tray support base comprising a first side wall and an opposing second side wall;

a tray platform supported by the tray support base, and sized and shaped to support an appliance, the tray platform being supported by the first and second side walls and comprising a beverage container support portion extending outwardly from the first side wall;

at least one compartment supported by the tray support base, and sized and shaped to support a portable power source device for powering the appliance; and a base receivable into a cup holder of the beverage container support portion, and further comprising a tray coupled to the base.

* * * * *